(12) United States Patent
Horng

(10) Patent No.: US 6,280,089 B1
(45) Date of Patent: Aug. 28, 2001

(54) ROTATIONAL SHAFT FOR A NON-BALL TYPE BEARING

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/444,384

(22) Filed: Nov. 22, 1999

(30) Foreign Application Priority Data

Jul. 15, 1999 (TW) .................................................. 88212006

(51) Int. Cl.[7] ...................................................... F16C 17/00
(52) U.S. Cl. ........................... 384/129; 384/115; 384/245
(58) Field of Search ........................... 384/91, 129, 100, 384/115, 157, 192–214, 215–222, 226, 276, 277–296, 375, 245; 310/90

(56) References Cited

U.S. PATENT DOCUMENTS

| | | | |
|---|---|---|---|
| 2,830,541 | * 4/1958 | Higgins et al. | 384/115 X |
| 5,385,408 | * 1/1995 | Tevaarwerk | 384/115 |
| 5,835,124 | * 11/1998 | Fukita et al. | 310/90 X |
| 6,040,649 | * 3/2000 | Horng | 310/90 X |
| 6,056,442 | * 5/2000 | Ono et al. | 384/286 |
| 6,066,903 | * 5/2000 | Ichiyama | 384/375 X |

FOREIGN PATENT DOCUMENTS 360341    6/1999   (TW) .

* cited by examiner

Primary Examiner—Thomas R. Hannon
(74) Attorney, Agent, or Firm—Bacon & Thomas, PLLC

(57) ABSTRACT

A shaft structure for rotational support by a non-ball type bearing includes a spherical rotation-supporting section and a non-spherical section. The spherical rotation-supporting section provides a support for the shaft when the shaft rotates in an axial hole of the non-ball type bearing, thereby reducing the frictional area between the shaft and the inner periphery of the axial hole of the non-ball type bearing.

9 Claims, 5 Drawing Sheets

ROTATIONAL SHAFT FOR A NON-BALL TYPE BEARING

BACKGROUND OF THE INVENTION

1. Field of the Invention

The present invention relates to shaft structures for rotational support by a non-ball type bearing and having a smaller contact surface with the non-ball type bearing, thereby reducing the frictional area.

2. Description of the Related Art

There are two types of commonly known bearings for rotational support the shaft of a miniature fan or motor. Namely ball bearings and non-ball type bearings. A ball bearing generally includes an inner race for receiving the shaft and an outer ring securely engaged in a hole of a bearing seat, thereby allowing smooth rotation of the balls of the ball bearing. Non-ball type bearings are made of abrasion-resistant material, such as copper bearings, oil-pregnant bearings, self-lubricating bearings, etc. The non-ball type bearing has an inner bore in non-tight contact with the shaft. During use the friction between shaft and bearing results in wears. After long time use the gap between shaft and bearing increased thereby resulting in skew problem of the shaft during rotation. In addition, the rotational noise is increased and the operating life of the bearing and the shaft are shortened.

Taiwan Utility Model Publication No. 360341, issued on Jun. 1, 1999 and entitled "IMPROVED FAN STRUCTURE", discloses a fan impeller with a cap body underneath and a shaft extended from a center of the cap body. A tubular bearing seat is provided in a center of a fan housing for fitting the shaft. An annular groove is defined between the cap body and an end of the shaft. The shaft includes an annular recessed section. A bearing sleeve is mounted around the shaft to define a first oil reservoir. The inner periphery of the bearing seat includes a number of grooves defined in parts corresponding to the bearing, thereby defining a second oil reservoir. The oil reservoirs store lubrication oil. The annular recessed section of the shaft may reduce the frictional area between the shaft and the bearing. Nevertheless, the shaft and the bearing are in non-tight contact and thus have a clearance therebetween. The shaft is supported at areas other than the annular recessed section during rotation. These two areas are circular and are thus in continuous frictional contact with the bearing.

SUMMARY OF THE INVENTION

It is a primary object of the present invention to provide a shaft structure for rotational support by a non-ball type bearing. The shaft includes at least one rotation-supporting section and at least one non-spherical section, thereby reducing the frictional area between the shaft and the inner periphery of the non-ball type bearing.

The shaft in accordance with the present invention includes at least one rotation-supporting section and at least one non-spherical section. The shaft is supported by the rotation-supporting section when the shaft rotates in an axial hole of the non-ball type bearing, thereby reducing the frictional area between the shaft and the inner periphery of the non-ball type bearing.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 2:
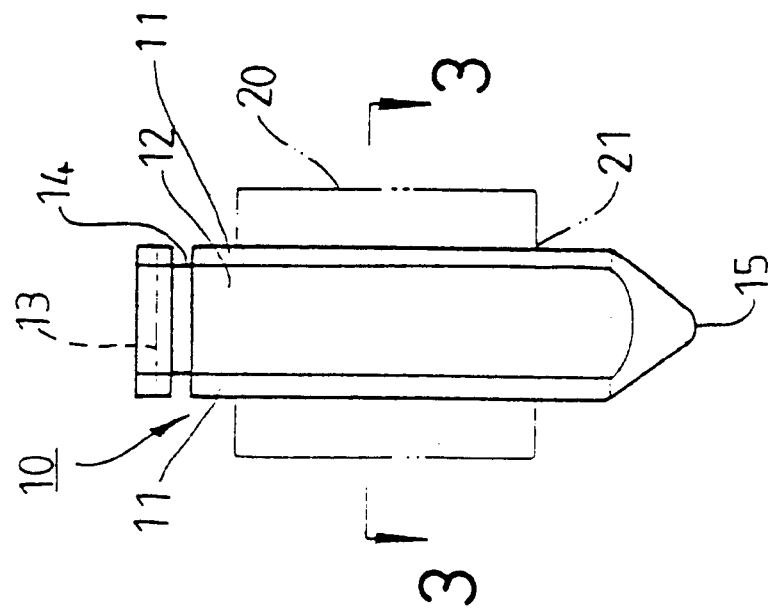
FIG. 2 is a sectional view of a non-ball type bearing and the first embodiment of the shaft structure in accordance with the present invention.
Figure 1:
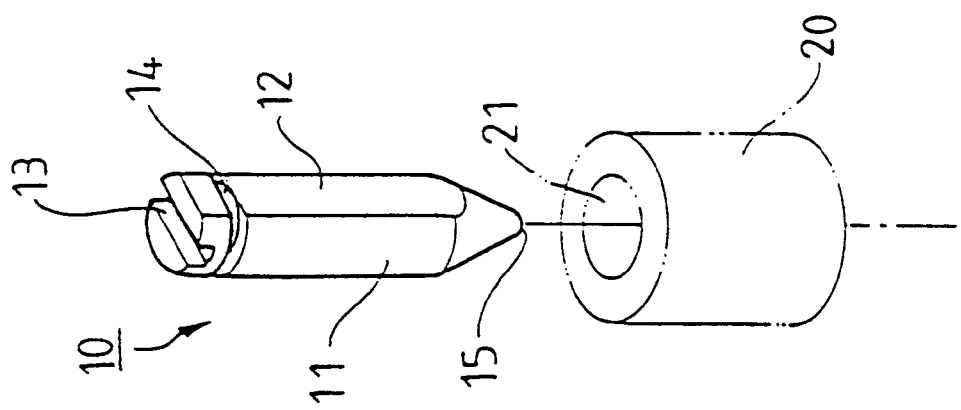
FIG. 1 is an exploded perspective view of a first embodiment of a shaft structure in accordance with the present invention.

Referring to FIGS. 1 and 2, a first embodiment of a shaft structure 10 in accordance with the present invention generally includes an outer periphery consisting of a rotation-supporting section 11 and a non-spherical section 12. The shaft 10 is supported by rotation-supporting section 11 to rotate in the axial hole 21 of non-ball type bearing 20. Preferably, the rotation-supporting section 11 is a spherical section that extends over a half of a circumference of the outer periphery. In order to provide securer engagement with a rotational object, an end of the shaft 10 may include a slot 13 in an end face thereof and/or an annular groove 14. The other end of the shaft 10 may include a conic end portion 15 (which rests on a support) so as to minimizing the friction and providing reliable rotation for the shaft 10.

Figure 4:
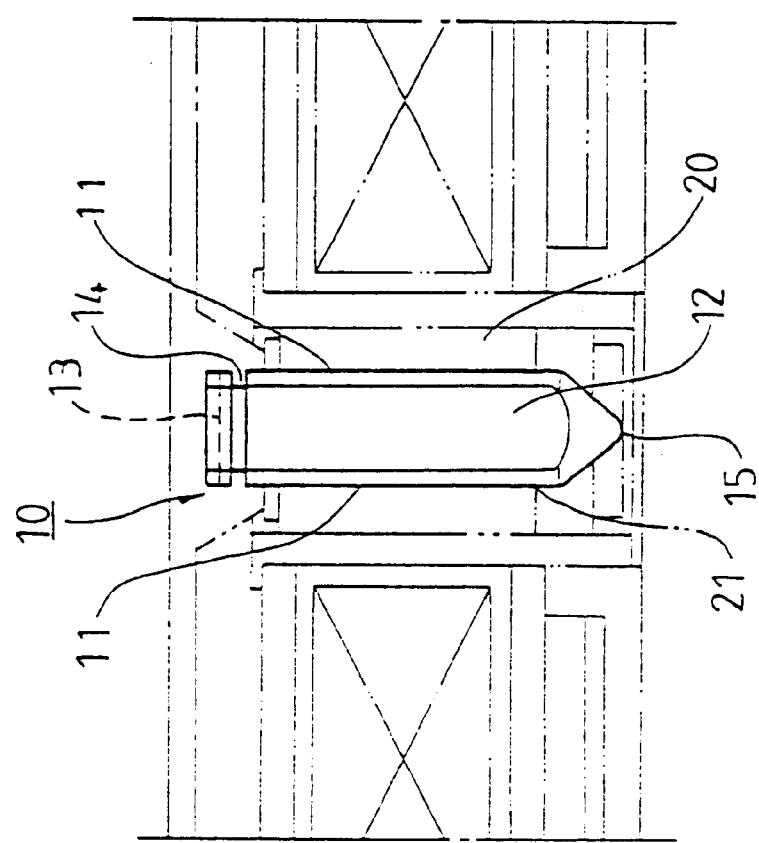
FIG. 4 is a schematic side view illustrating application of the first embodiment of the shaft structure in accordance with the present invention to a heat-dissipating fan.
Figure 3:
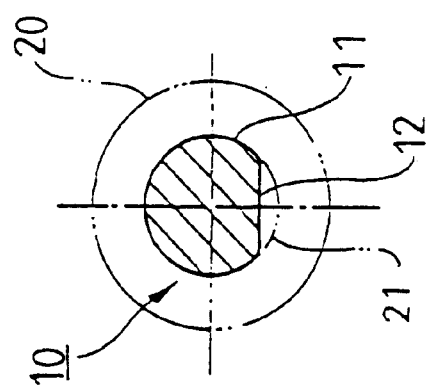
FIG. 3 is a sectional view taken along line 3—3 in FIG. 2.

Referring to FIGS. 3 and 4, when the shaft 10 is engaged in an axial hole 21 of a non-ball type bearing, it is the rotation-supporting section 11 that provides a support for the shaft 10 to rotate in the axial hole 21. The frictional area between the shaft 10 and inner periphery of the axial hole 21 of the non-ball type bearing 20 is reduced due to provision of the non-spherical section 12. Thus, friction and wear between the shaft 10 and the inner periphery of the axial hole 21 of the non-ball type bearing 20 are reduced during rotation of the shaft 10.

Figure 6:
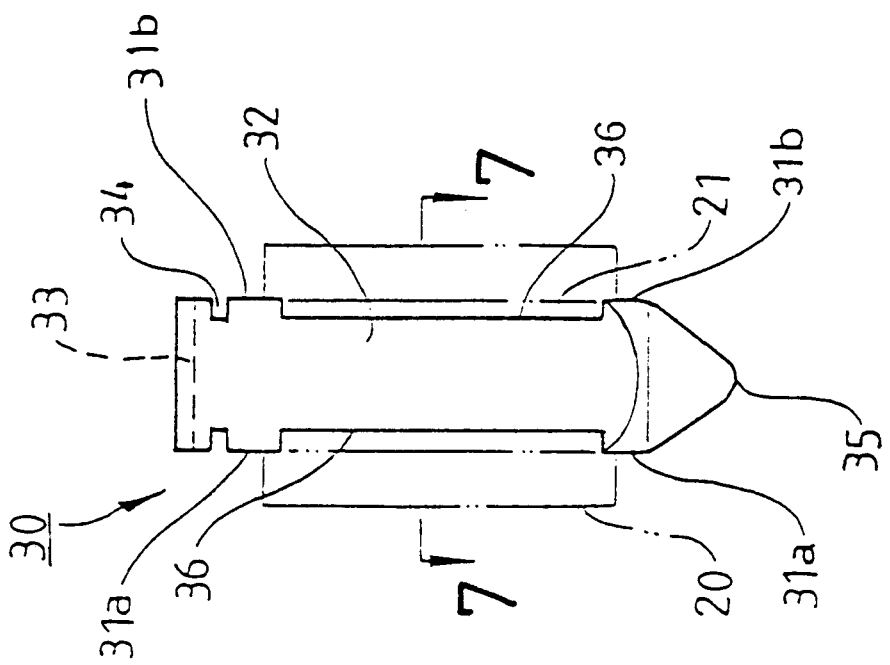
FIG. 6 is a sectional view of a non-ball type bearing and the second embodiment of the shaft structure in accordance with the present invention.
Figure 5:
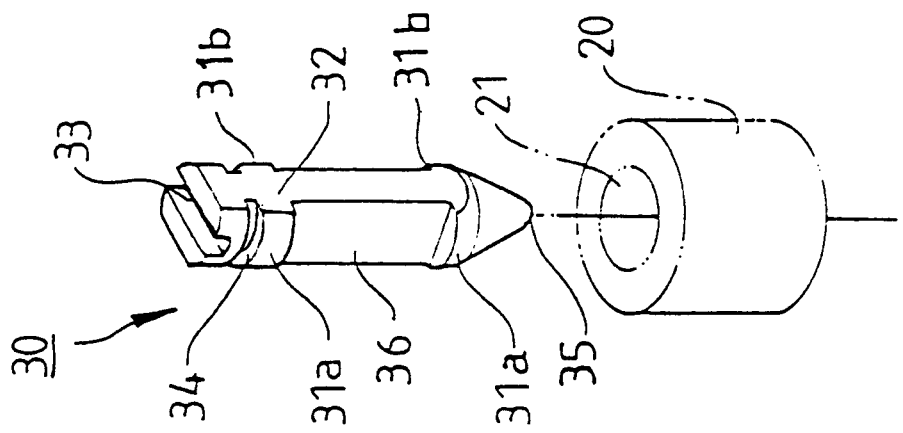
FIG. 5 is an exploded perspective view of a second embodiment of a shaft structure in accordance with the present invention.

Referring to FIGS. 5 and 6, a second embodiment of the shaft structure 30 in accordance with the present invention includes an outer periphery having two rotation-supporting sections 31a and 31b that have spherical surfaces. The rotation-supporting sections 31a and 31b provide a support for the shaft 30 to be rotate in the axial hole 21 of the non-ball type bearing 20. Two non-spherical sections 32 are provided between the rotation-supporting sections 31a and 31b. Each rotation-supporting section 31a, 31b may have a recessed section 36. In addition, the non-spherical sections 32 are arranged in a symmetric manner reference to the center of the shaft 30. An end of the shaft 30 may include a slot 33 in an end face thereof and/or an annular groove 34. The other end of the shaft 30 may include a conic end portion 35 that rests on a support.

Figure 7:
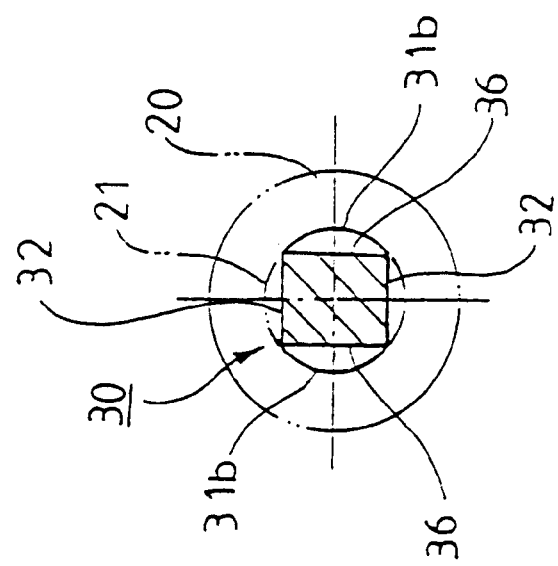
FIG. 7 is a sectional view taken along line 7—7 in FIG. 6.

Referring to FIG. 7, when the shaft 30 is engaged in an axial hole 21 of the non-ball type bearing, it is the rotation-supporting sections 31 *a* and 31 *b* that provide a support for allowing the shaft 30 to rotate in the axial hole 21 of the non-ball type bearing 20. The frictional area between the shaft 30 and inner periphery of the axial hole 21 of the non-ball type bearing 20 is reduced due to provision of the non-spherical sections 32 and the recessed sections 36. Thus, friction and wear between the shaft 30 and the inner periphery of the axial hole 21 of the non-ball type bearing 20 are reduced during rotation of the shaft 30.

Figure 8:
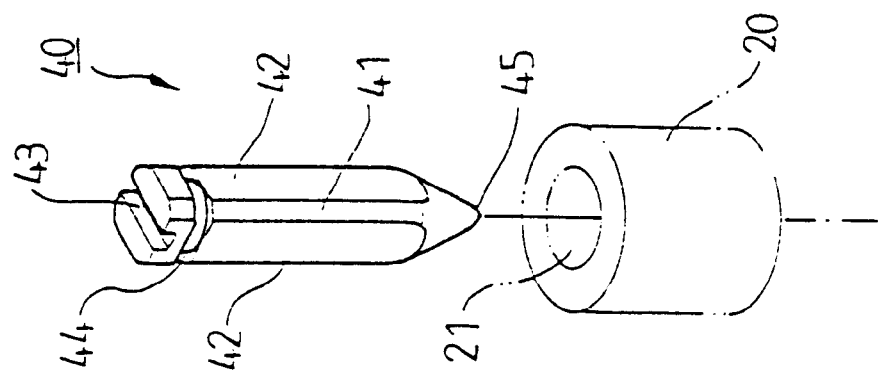
FIG. 8 is an exploded perspective view of a third embodiment of a shaft structure in accordance with the present invention.
Figure 10:
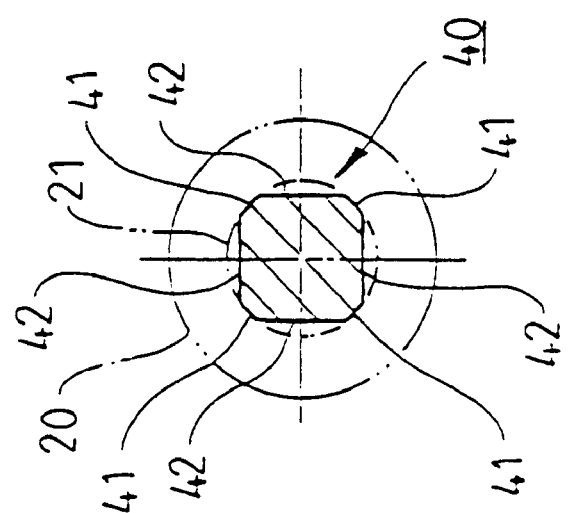
FIG. 10 is a sectional view taken along line 10—10 in FIG. 9.
Figure 9:
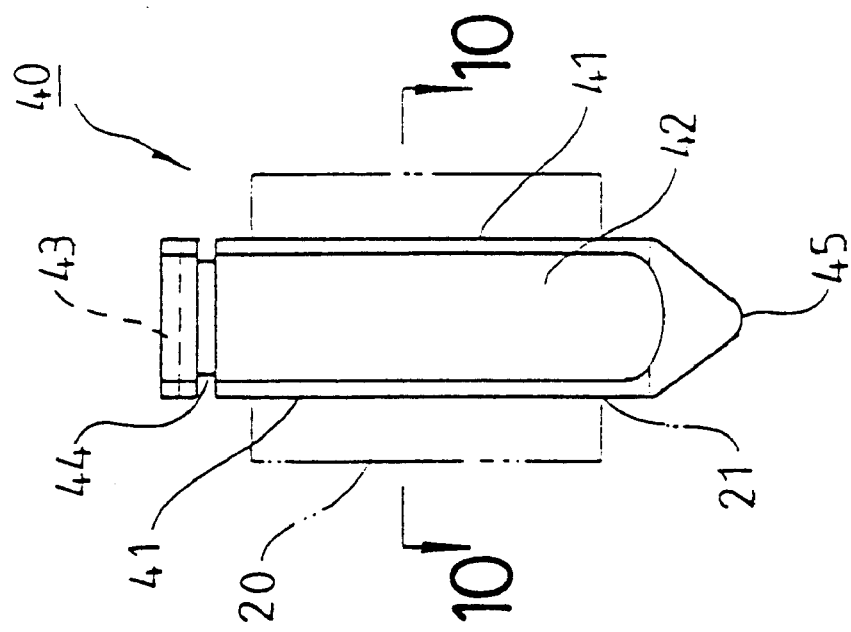
FIG. 9 is a sectional view of a non-ball type bearing and the third embodiment of the shaft structure in accordance with the present invention.

Referring to FIGS. 8 and 9, a third embodiment of the shaft structure 40 in accordance with the present invention includes an outer periphery having a number of rotation-supporting sections 41 with spherical surfaces for providing a support for the shaft 40 when the shaft 40 rotates in the axial hole 21 of the non-ball type bearing 20. A non-spherical section 42 is defined between each two adjacent rotation-supporting sections 41. The non-spherical sections 42 are arranged inequi angular reference to the center of the shaft 40. An end of the shaft 40 may include a slot 43 in an end face thereof and/or an annular groove 44. The other end of the shaft 40 may include a conic end portion 45 that rests on a support. Each rotation-supporting section 41 may have a recessed section disclosed in the second embodiment if desired. Referring to FIG. 10, when the shaft 40 is engaged in an axial hole 21 of the non-ball type bearing, it is the rotation-supporting sections 41 that provide a support for the shaft 40 to rotate in the axial hole 21. The frictional area between the shaft 40 and inner periphery of the axial hole 21 of the non-ball type bearing 20 is reduced due to provision of the non-spherical sections 42. Thus, friction and wear between the shaft 40 and the inner periphery of the axial hole 21 of the non-ball type bearing 20 are reduced during rotation of the shaft 40.

According to the above description, it is appreciated that the frictional area between the shaft and the inner periphery of the axial hole of the non-ball type bearing is reduced during rotation of the shaft. Friction and wear are reduced and the operational life is lengthened. In addition, the non-spherical section(s) of the shaft may be formed by cutting or grinding that is more convenient than milling, thereby reducing the manufacturing cost for the shaft.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A shaft structure for rotational support in a bearing having a cylindrical axial hole, the shaft structure comprising an outer periphery including a cylindrical rotation-supporting section and a non-cylindrical section, the rotation-supporting section having a cylindrical surface that extends over one-half a circumference of the outer periphery, and the rotation-supporting section providing support for the shaft when the shaft rotates in the axial hole of the bearing.

2. The shaft as claimed in claim 1, wherein the non-cylindrical section is a flat surface.

3. The shaft as claimed in claim 1, wherein the shaft includes a conic end for engaging a support.

4. The shaft as claimed in claim 1, wherein the rotation-supporting section includes a recessed section.

5. A shaft structure for rotational support in a bearing having a cylindrical axial hole, the shaft structure comprising an outer periphery including at least two cylindrical rotation-supporting sections, each two adjacent rotation-supporting sections having a non-cylindrical section therebetween, and the rotational-supporting sections providing support for the shaft when the shaft rotates in the axial hole of the bearing.

6. The shaft as claimed in claim 5, wherein each non-cylindrical section is a flat surface.

7. The shaft as claimed in claim 5, wherein the shaft includes a conic end for engaging a support.

8. The shaft as claimed in claim 5, wherein each said rotation-supporting section includes a recessed section.

9. The shaft as claimed in claim 5, wherein said non-cylindrical sections are arranged equiangularly around the center of the shaft.

\* \* \* \* \*